United States Patent
Yamamoto et al.

(10) Patent No.: US 12,424,958 B2
(45) Date of Patent: Sep. 23, 2025

(54) METHOD OF AND APPARATUS FOR CONTROLLING SINGLE-PHASE INDUCTION MOTOR, AND ELECTRIC CHAIN BLOCK

(71) Applicant: KITO CORPORATION, Yamanashi (JP)

(72) Inventors: Tatsuru Yamamoto, Yamanashi (JP); Takuma Isshiki, Yamanashi (JP)

(73) Assignee: KITO CORPORATION, Nakakoma-gun (JP)

( * ) Notice: Subject to any disclaimer, the term of this patent is extended or adjusted under 35 U.S.C. 154(b) by 89 days.

(21) Appl. No.: 18/279,352

(22) PCT Filed: Feb. 2, 2022

(86) PCT No.: PCT/JP2022/004072
§ 371 (c)(1),
(2) Date: Aug. 29, 2023

(87) PCT Pub. No.: WO2022/190720
PCT Pub. Date: Sep. 15, 2022

(65) Prior Publication Data
US 2024/0136964 A1  Apr. 25, 2024
US 2024/0235448 A9  Jul. 11, 2024

(30) Foreign Application Priority Data
Mar. 10, 2021  (JP) ................ 2021-038632

(51) Int. Cl.
*H02P 25/04* (2006.01)
*H02P 29/024* (2016.01)

(52) U.S. Cl.
CPC ............ *H02P 25/04* (2013.01); *H02P 29/024* (2013.01)

(58) Field of Classification Search
CPC ........ H02P 1/44; H02P 25/188; H02P 29/024; H02P 23/00; H02P 25/04; H02K 77/60
See application file for complete search history.

(56) References Cited

U.S. PATENT DOCUMENTS 5,774,426 A * 6/1998 Tu ..................... H02P 8/16
  318/696
2006/0163956 A1  7/2006 Sahashi et al.

FOREIGN PATENT DOCUMENTS

JP  56-67894 U   6/1981
JP  3-265492 A   11/1991
(Continued)

OTHER PUBLICATIONS

International Search Report dated Apr. 5, 2022, issued in counterpart International Application No. PCT/JP2022/004072, with English Translation. (6 pages).

(Continued)

*Primary Examiner* — Said Bouziane
(74) *Attorney, Agent, or Firm* — WHDA, LLP (57) ABSTRACT

To provide a single-phase induction motor control method and apparatus and an electric chain block which are capable of appropriately judging an overload of a single-phase induction motor even when the single-phase induction motor is in a condition where energization of an auxiliary coil is repeated.

Provided is a method of controlling a single-phase induction motor including a main coil ML, an auxiliary coil AL, a capacitor C, and an SSR (solid-state relay) power circuit 121, in which the main coil ML is supplied with an electric current from a single-phase alternating-current power supply 200 through the SSR power circuit 121, and when the load is heavy, the auxiliary coil AL is energized. An overload (Continued)

is judged based on the ratio of energizing time during which the auxiliary coil AL is energized within a predetermined time.

9 Claims, 8 Drawing Sheets

(56) References Cited

FOREIGN PATENT DOCUMENTS

| JP | 6-78592 A | 3/1994 |
|----|-----------|--------|
| JP | 2004-72913 A | 3/2004 |
| JP | 2005-73329 A | 3/2005 |
| JP | 2005-110457 A | 4/2005 |
| JP | 2014-138469 A | 7/2014 |

OTHER PUBLICATIONS

Written Opinion of the International Searching Authority (Form PCT/ISA/237) dated Apr. 5, 2022, issued in counterpart International Application No. PCT/JP2022/004072, with English Translation. (8 pages).

* cited by examiner

Capacitor run

FIG.4

Simple single-phase run

FIG.5

Auxiliary coil energizing time ratio

FIG.6A

Main coil electric power value

METHOD OF AND APPARATUS FOR CONTROLLING SINGLE-PHASE INDUCTION MOTOR, AND ELECTRIC CHAIN BLOCK

TECHNICAL FIELD

The present invention relates to a method of and apparatus for controlling a single-phase induction motor, which is widely used in drive sections of devices moving loads with different weights, such as electric chain blocks or other similar load moving devices, and also relates to an electric chain block.

BACKGROUND ART

Figure 1:
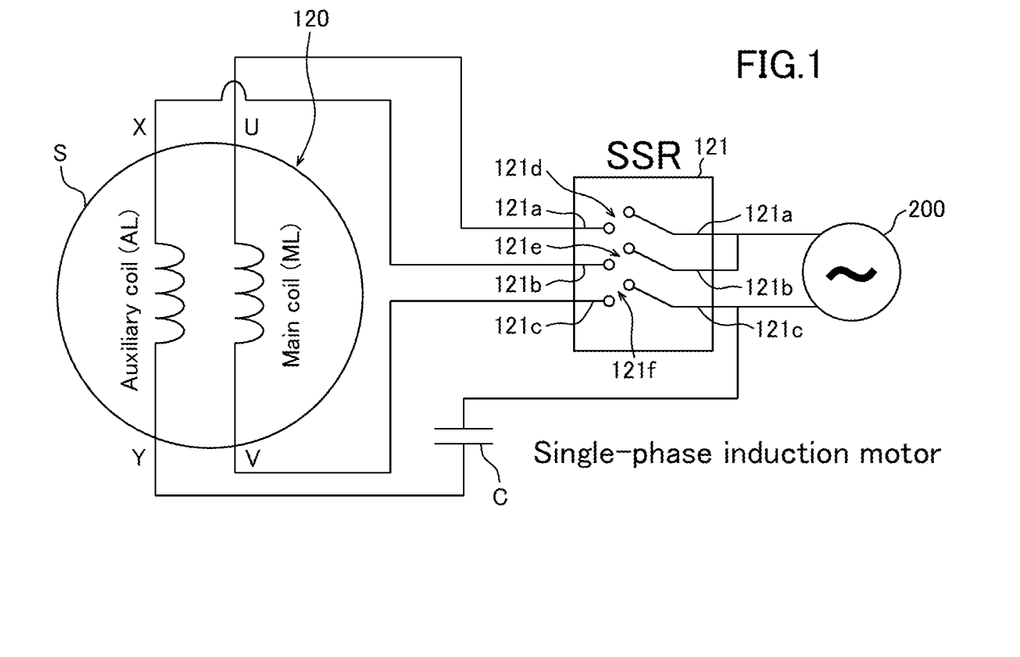
FIG. 1 is a block diagram showing the schematic circuit configuration of a single-phase induction motor according to the present invention.

Single-phase induction motors are widely used in small-sized load hoisting-lowering devices which move loads in the vertical direction such as electric chain blocks. There are various types of single-phase induction motors. FIG. 1 is a diagram showing the schematic circuit configuration of a single-phase induction motor dealt with in the present invention. A single-phase induction motor section 120 includes, in a stator S, a main coil ML having a U terminal and a V terminal at opposite ends thereof, respectively, and an auxiliary coil AL having an X terminal and a Y terminal at opposite ends thereof, respectively. At starting, the main coil ML is supplied with an alternating current from a single-phase alternating-current power supply 200 via an SSR (solid-state relay) power circuit 121, and at the same time, the auxiliary coil AL is also supplied with an alternating current from the single-phase alternating-current power supply 200 via the SSR power circuit 121 and a capacitor C. Consequently, a rotating magnetic field is generated in the stator S, and a rotor (not shown) rotatably supported opposite to the main coil ML and the auxiliary coil AL starts rotating, thus starting the single-phase induction motor.

Figure 2:
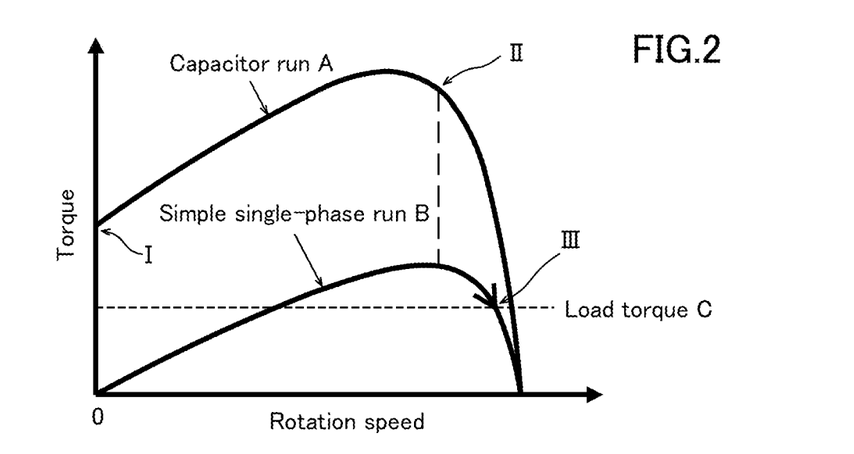
FIG. 2 is a diagram showing the way in which the torque changes from the starting of the single-phase induction motor.

FIG. 2 is a diagram showing the way in which the torque changes from the starting of the single-phase induction motor. Curve A shows the motor torque change when the rotor is rotated by turning on energization to both the main coil ML and the auxiliary coil AL. Curve B shows the torque change when energization to the main coil ML is turned on, and energization to the auxiliary coil AL is turned off. The axis of ordinate represents the torque, and the axis of abscissas represents the rotation speed. It should be noted that the operation of the single-phase induction motor in which energization to both the main coil ML and the auxiliary coil AL is turned on is referred to as "capacitor run" (see FIG. 3), and that the operation of the single-phase induction motor in which energization to the main coil ML is turned on and energization to the auxiliary coil AL is turned off is referred to as "simple single-phase run" (see FIG. 4). It should also be noted that this single-phase induction motor is one that is classified as the capacitor start type but not one that is classified as the capacitor run type, which is operated by energizing the auxiliary coil AL at all times.

Figure 4:
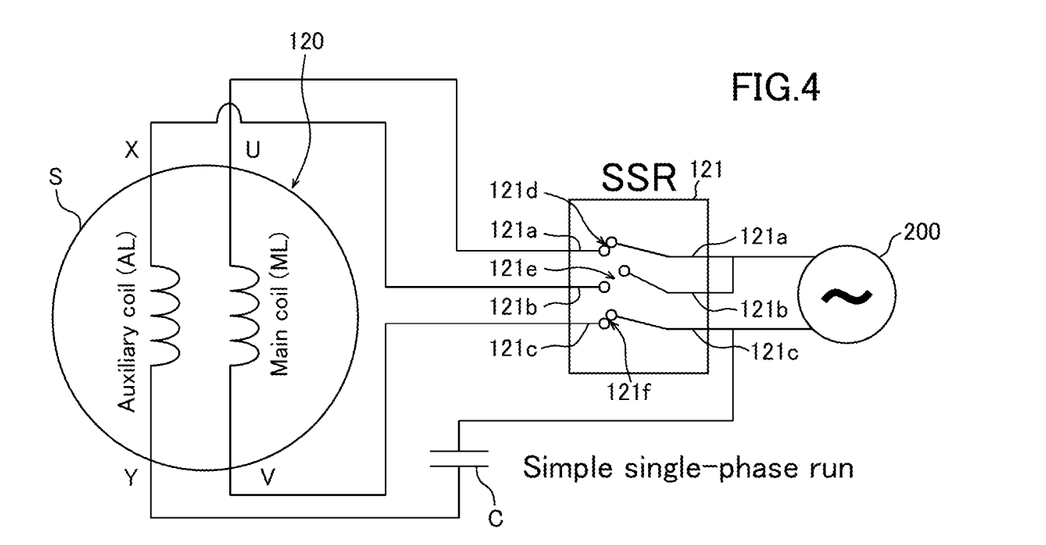
FIG. 4 is a diagram showing the schematic circuit configuration when the single-phase induction motor is in the simple single-phase run mode.

First, to start the single-phase induction motor, the operation of the motor is started in the capacitor run mode from the rotation speed 0 (point I on curve A in FIG. 2). Thereafter, the torque of the single-phase induction motor rises (increases) as the rotation speed increases until reaching the peak, and falls (decreases) rapidly from the peak. At point II that is beyond the peak by a predetermined quantity, as shown in FIG. 4, the energization to the auxiliary coil AL is turned off (switching contact pair 121e of current path 121b is turned off), thereby switching (shifting) the motor to the simple single-phase run. Thereafter, the rotation speed further increases, and when the torque balances with the load torque C (point III), the motor enters a steady-state operation. Switching from the capacitor run shown by curve A to the simple single-phase run shown by curve B is performed by the SSR power circuit 121, which makes a judgment based on the value of electric current flowing through the main coil ML. In addition, as shown in FIG. 2, the output torque of the single-phase induction motor is determined by the rotation speed, and the output torque of the single-phase induction motor and the electric current value are correlated with each other. Accordingly, a conventional overload limiter OLL (hereinafter referred to as simply "OLL") carries out an overload judgment by judging the output torque of the single-phase induction motor based on the value of electric current flowing through the main coil ML.

Regarding the single-phase induction motor, however, it may be difficult to judge an over-output torque, i.e. overload, of the single-phase induction motor based on the electric current value under specific circumstances, for example, when a load with a rated load weight is hoisted by a load hoisting-lowering device such as an electric chain block under lowest operation-guaranteed voltage conditions, or high-temperature or low-temperature conditions. When the single-phase induction motor is operated upon application of a low voltage or at high temperatures, the output torque of the single-phase induction motor itself lowers. When the single-phase induction motor is operated at low temperatures, an increase in machine loss causes an increase in the load torque applied to the motor. Accordingly, it is difficult to distinguish between the load torque and the overweight of the load (overload).

Figure 5:
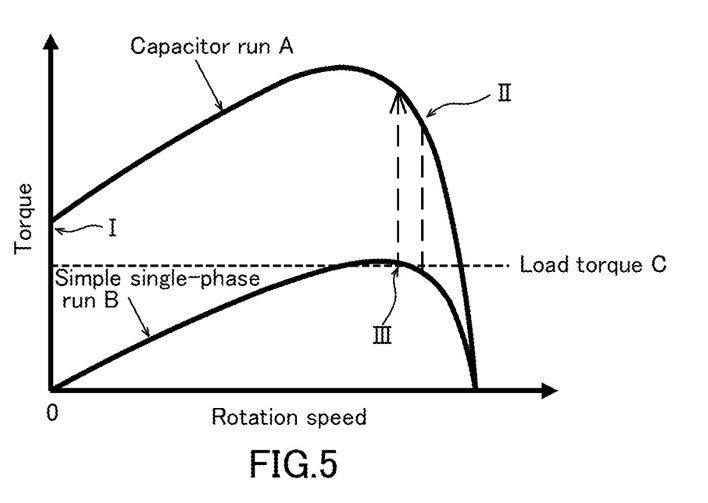
FIG. 5 is a diagram showing the way in which the torque changes from the starting of the single-phase induction motor.

FIG. 5 shows the way in which the single-phase induction motor is accelerated under the above-described severe conditions. At starting, the operation is started (point I) in the capacitor run mode shown by curve A in the same way as under the normal conditions. Thereafter, the rotation speed increases favorably, and when the electric current value of the main coil ML becomes not greater than a predetermined switching threshold value (point II in FIG. 5), the capacitor run is switched to the simple single-phase run shown by curve B. So far, the operation is similar to that in the normal capacitor starting. However, if the capacitor run is switched to the simple single-phase run under the severe conditions, the load torque C may be substantially equal to or greater than the output torque of the single-phase induction motor. Under these circumstances, the single-phase induction motor may be decelerated, and when the electric current value of the main coil ML reaches a threshold value at which the operation mode is switched to the capacitor run, the simple single-phase run is switched to the capacitor run shown by curve A (point III) again to accelerate the single-phase induction motor by the capacitor run shown by curve A. At point II, the operation mode is switched to the simple single-phase run shown by curve B. When the single-phase induction motor is decelerated again, the operation mode is switched to the capacitor run shown by curve A.

As has been described above, the output torque of the single-phase induction motor is correlated with the rotation speed. However, under the circumstances where the capacitor run and the simple single-phase run are alternately repeated as described above, the electric current value is unstable although the motor operation can be continued. Accordingly, under the above-described circumstances, the judgment cannot be appropriately performed by the conventional OLL, which makes a judgment based on the electric current value of the single-phase induction motor. Consequently, the range of use of the single-phase induction motor as a manufactured article is limited undesirably. The simplest solution to this problem is to use a single-phase induction motor capable of providing a sufficient output under any circumstances. This, however, gives rise to a problem that the single-phase induction motor needs to be made large in size only for preparations for the worst rare case.

CITATION LIST

Patent Literature

Patent Literature 1: Japanese Utility Model Registration Application Publication No. Syo 56-067894

SUMMARY OF INVENTION

Technical Problem

Patent Literature 1 discloses a technique relating to an overload control apparatus for an electric motor. The technique disclosed in Patent Literature 1 is similar to the invention of this application in that the technique relates to an overload control apparatus for a capacitor boot (start) type single-phase induction motor, but different from the invention of this application in the following points.

The invention of Patent Literature 1 is, as has been described above, an overload control apparatus for a capacitor start type single-phase induction motor, and judges an overload on the basis of whether or not an overload electric current has been continuously flowing in excess of a predetermined period of time. The single-phase induction motor overload control apparatus described in Patent Literature 1 gives rise to a problem that the single-phase induction motor cannot be used under severe conditions, which is a subject of the invention of this application. Even if an operation in which the operation mode is switched from the simple single-phase run to the capacitor run in a short period of time is frequently performed, this may be judged to be a noise and may not be judged to be an overload.

The invention of Patent Literature 1 is configured to exclude noises and temporary overloads from the judgment, thereby allowing judgment to be made without any problem. In contrast to this, it is not an object of the present invention to prevent occurrence of problems as described above, but it is an object of the present invention to enable overload judgment even under conditions where judgment cannot be made by the conventional overload judging method, thereby enlarging the adaptable range of the overload judgment.

Further, another object of the present invention is to provide a single-phase induction motor control method and apparatus and an electric chain block which are capable of appropriately judging an overload of a single-phase induction motor regardless of whether the single-phase induction motor is in the capacitor run mode or in the simple single-phase run mode.

Solution to Problem

To solve the above-described problems, the present invention provides a single-phase induction motor control method of controlling a single-phase induction motor including a main coil, an auxiliary coil, a capacitor, and a driving circuit, wherein the main coil is supplied with an electric current from a single-phase alternating-current power supply through the driving circuit, and the auxiliary coil is supplied with an electric current from the single-phase alternating current power supply via the capacitor when the load current of the main coil is large. The single-phase induction motor control method is characterized by adopting any one or not less than two of the following overload judging methods (1) to (4):

(1) An overload judging threshold value is provided for electric power supplied to the main coil, and when the electric power supplied to the main coil has exceeded the overload judging threshold value provided for the electric power, it is judged that the single-phase induction motor is overloaded.

(2) An overload judgment threshold value is provided for the ratio of energizing time during which the auxiliary coil is energized to the operating time of the single-phase induction motor, and when the ratio of energizing time during which the auxiliary coil is energized has exceeded the overload judgment threshold value provided for the ratio of the energizing time, it is judged that the single-phase induction motor is overloaded.

(3) An overload judgment threshold value is provided for the ratio of energizing time during which the auxiliary coil is energized within a predetermined time, and when the ratio of energizing time during which the auxiliary coil is energized within a predetermined time has exceeded the overload judgment threshold value provided for the ratio of the energizing time, it is judged that the single-phase induction motor is overloaded.

(4) An overload judgment threshold value is provided for the integrated value of energizing time during which the auxiliary coil is energized within a predetermined time, and when the integrated value of energizing time during which the auxiliary coil is energized within a predetermined time has exceeded the overload judgment threshold value provided for the integrated value of the energizing time, it is judged that the single-phase induction motor is overloaded.

As has been described above, only any one of the foregoing overload judging methods (1) to (4) may be used, and any plurality of ones of these overload judging methods may also be used. When a plurality of overload judging methods are used, it may be finally judged that the single-phase induction motor is overloaded upon condition that any one of the plurality of overload judging, methods judges that the single-phase induction motor is overloaded. Alternatively, a final judgment may be made that the single-phase induction motor is overloaded upon condition that all the overload judging methods judge that the single-phase induction motor is overloaded.

According to the present invention, the capacitor start type single-phase induction motor control method is capable of judging highly accurately whether or not the single-phase induction motor is overloaded even in a region where the electric current of the main coil is unstable.

In the present invention, combined use may be made of the overload judging method (1) wherein an overload judgment threshold value is provided for the electric power supplied to the main coil, and the other overload judging method (2) or (3) or (4) wherein an overload judgment threshold value is provided for energizing time during which the auxiliary coil is energized. If the overload judging methods (1) and (2) or (3) or (4) are used in combination, when a load considerably exceeding the rated load acts, whether or not the single-phase induction motor is overloaded can be judged based on the value of electric power supplied to the main coil before an overload judgment is made with respect to the energizing time of the auxiliary coil. Therefore, damage to the devices can be prevented even more effectively.

In addition, the present invention resides in a single-phase induction motor control apparatus for controlling an single-phase induction motor including a main coil, an auxiliary coil, a capacitor, and a driving circuit, wherein the main coil is supplied with an electric current from a single-phase alternating-current power supply through the driving circuit, and the auxiliary coil is supplied with an electric current from the single-phase alternating-current power supply through the driving circuit and via the capacitor. The single-phase induction motor control apparatus is characterized by including an overload judging device performing an overload judgment by using any one or not less than two of the above-described methods (1) to (4).

Only any one of the overload judging devices using the foregoing methods (1) to (4) may be used, and any plurality of these overload judging devices may also be used. This is the same as in the case of the above-described single-phase induction motor control method.

According to the present invention, the capacitor start type single-phase induction motor control apparatus is capable of judging highly accurately whether or not the single-phase induction motor is overloaded even in a region where the electric current of the main coil is unstable.

In addition, the present invention resides in an electric chain block including a load sheave having a load chain engaged therewith, and a single-phase induction motor rotating the load sheave. The electric chain block is characterized by including the above-described single-phase induction motor control apparatus.

According to the electric chain block, it is possible to appropriately judge whether or not a suspended object is an overload even in a region where overload judgment is deemed to be impossible in the past, and hence possible to safely stop lifting of an overload.

Advantages of Invention

The present invention enables overload judgment under conditions where overload judgment cannot be carried out by the conventional overload judging method, thereby making it possible to enlarge the adaptable range of the overload judgment. Thus, it is possible to appropriately judge an overload of a single-phase induction motor.

DESCRIPTION OF EMBODIMENTS

Embodiments of the present invention will be explained below in detail. FIG. 1 is a diagram showing the schematic circuit configuration of a single-phase induction motor for carrying out overload judgment according to the invention of this application. The single-phase induction motor has a single-phase induction motor section 120 including, in a stator S, a main coil ML having a U terminal and a V terminal at opposite ends thereof, respectively, and an auxiliary coil AL having an X terminal and a Y terminal at opposite ends thereof, respectively. The single-phase induction motor further has an SSR power circuit 121, and a capacitor C. The SSR (solid-state relay) power circuit 121 includes three current paths 121a, 121b and 121c. The current paths 121a, 121b and 121c have electrical switching contact pairs 121d, 121e and 121f at halfway points thereof, respectively. The input side (single-phase alternating-current power supply 200 side) and the output side (single-phase induction motor section 120 side) of each of the current paths 121a, 121b and 121c are electrically connected and disconnected by turning on and off the switching contact pairs 121d, 121e and 121f. It should be noted that the switching contact pairs 121d, 121e and 121f are here imaged in the figure so as to turn on and off mechanically in order to make the explanation easy to understand. In actuality, however, the switching contact pairs 121d, 121e and 121f comprise non-contact devices (e.g. triacs), respectively. It should be noted that a forward-reverse rotation circuit for the motor, a current sensor, and a voltage sensor will be described later in detail.

In the SSR power circuit 121, the input-side end of the current path 121a and the input-side end of the current path 121b are electrically connected together. The output-side end of the current path 121a is connected to the U terminal of the main coil ML in the single-phase induction motor section 120, and the output-side end of the input-output terminal 121b is connected to the X terminal of the auxiliary coil AL in the single-phase induction motor section 120. Further, the output-side end of the current path 121c is connected to the V terminal of the main coil ML. Further, the capacitor C has one end thereof electrically connected to the input side of the current path 121c of the SSR power circuit 121, and the other end of the capacitor C is connected to the Y terminal of the auxiliary coil AL in the single-phase induction motor section 120. The single-phase induction motor section 120 is at a standstill when in the state shown in FIG. 1, i.e. when all the switching contact pairs 121d, 121e and 121f of the current paths 121a, 121b and 121c in the SSR power circuit 121 are off.

Figure 3:
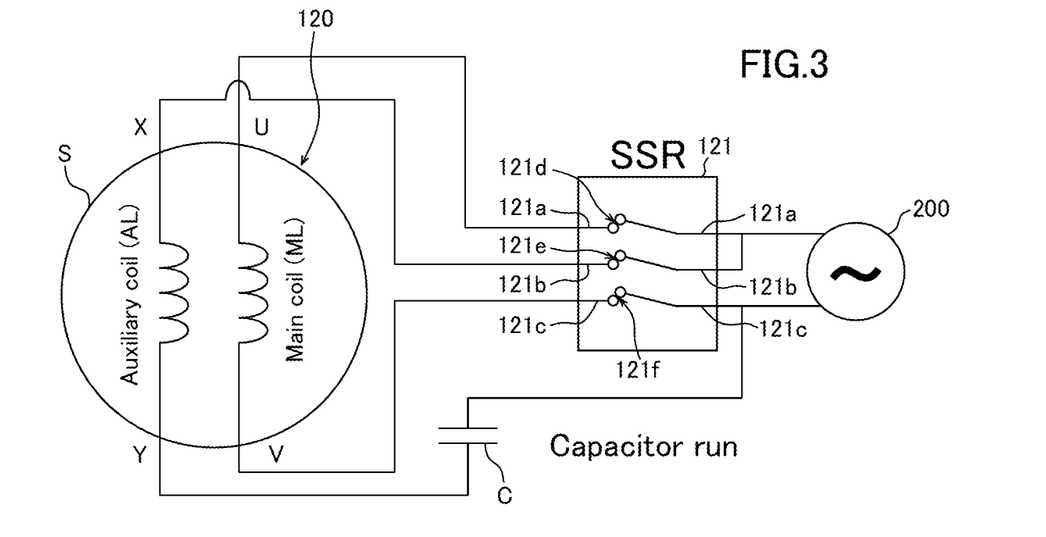
FIG. 3 is a diagram showing the schematic circuit configuration when the single-phase induction motor is in the capacitor run mode.

FIG. 3 shows a state where the single-phase induction motor has started. In this state, the switching contact pairs 121d, 121e and 121f of all the current paths 121a to 121c in the SSR power circuit 121 are on, and single-phase electric power is being supplied to the single-phase induction motor section 120. Because the capacitor C is connected to the auxiliary coil AL in series, a rotating magnetic field is generated in the stator S from the rotation speed 0 due to a phase difference between the electric current flowing through the main coil ML and the electric current flowing through the auxiliary coil AL, and a rotor (not shown) rotatably supported oppositely in the stator S rotates. Thus, the single-phase induction motor section 120 starts. Operating the single-phase induction motor by energization to the auxiliary coil AL having the capacitor C connected in series in addition to the energization to the main coil ML is herein referred to as "capacitor run", as has been stated above.

FIG. 4 shows a state where the supply of electric current to the auxiliary coil AL is stopped upon detecting that the electric current of the main coil ML has decreased to a predetermined value after the starting of the single-phase induction motor, and consequently the single-phase induction motor is operated only by the energization to the main coil ML. That is, after a predetermined time has elapsed from the starting of the single-phase induction motor section 120, the rotation speed of the motor increases, and when the electric current value of the main coil ML becomes not greater than the switching threshold value, the switching contact pair 121e of the current path 121b is turned off. Thus, the single-phase induction motor is being operated in the simple single-phase run mode, as has been defined above.

As has been stated above, the single-phase induction motor is started in the capacitor run mode, and after a predetermined time has elapsed, the motor operation mode is switched to the simple single-phase run. In a state where the single-phase induction motor is operated in the simple single-phase run, if a rated load operation is to be performed under such conditions as low-voltage conditions, high-temperature conditions, or low-temperature conditions, for example, there will be a need of an output which is close to the maximum torque that can be output by the simple single-phase run under the same conditions. To cope with this, an electric current value of the main coil ML at which switching is made from the simple single-phase run to the capacitor run is set so that the single-phase induction motor will not stall in the simple single-phase run. The SSR power circuit 121 turns on the switching contact pair 121e of the current path 121b to switch to the capacitor run operation, and when the rotation speed of the motor increases and hence the electric current of the main coil ML becomes not greater than the switching threshold value, the SSR power circuit 121 turns off the switching contact pair 121e to switch to the simple single-phase run operation. When the electric current of the main coil ML exceeds the switching threshold value again, the SSR power circuit 121 turns on the switching contact pair 121e to switch to the capacitor run. Thus, the single-phase induction motor is operated while frequently switching between the capacitor run and the simple single-phase run. When the single-phase induction motor is operated while frequently switching between the capacitor run and the simple single-phase run, although the operation can be continued, the electric current value or the electric power value will not become stable, so that an overload cannot be judged from only the magnitude of the electric current value as in the past. In other words, the overload judgment is undesirably limited within the range in which OLL can be used.

The above-described problem in the operation of the single-phase induction motor will be explained in further detail by using FIGS. 1 to 5. When all the switching contact pairs 121d, 121e and 121f of the current paths 121a, 121b and 121c in the SSR power circuit 121 shown in FIG. 1 are switched from an off-state to an on-state as shown in FIG. 3, the operation of the single-phase induction motor section 120 starts at point I in FIG. 2, and the output torque of the single-phase induction motor section 120 increases as the rotation speed increases along the capacitor run curve A in FIG. 2. At point II that is beyond the peak of the capacitor run curve A by a predetermined quantity, the switching contact pair 121e of the current path 121b is turned off. Consequently, the single-phase induction motor section 120 enters a steady-state operation in the simple single-phase nm mode.

When the single-phase induction motor is operated as stated above, the following problems arise. When the single-phase induction motor is operated in environments such as lowest operation guaranteed voltage conditions or high-temperature conditions, the output torque lowers. When the single-phase induction motor is operated under low-temperature conditions, the load torque increases. Let us explain this with reference to FIG. 5. In a rated load operation at low voltage or at high temperature, a load torque C is needed which is close to the maximum torque that can be output by the simple single-phase run, which is shown by curve B, under the same conditions. Therefore, if the motor operation is switched to the simple single-phase run curve B at point II of the capacitor run curve A, it may be impossible to output a torque capable of continuing the stable operation in the simple single-phase run mode. Under low temperature conditions, the load applied to the motor may exceed an output torque assumed from the simple single-phase run curve B. In such a case, the electric current value of the main coil ML increases in excess of the switching threshold value, making it necessary to switch to the capacitor run curve A at point III of the simple single-phase run curve B, which results in operating the single-phase induction motor while frequently switching between the capacitor run and the simple single-phase run. Consequently, the rotation speed and the electric current value or the electric power value will not become stabilized, so that an overload judgment cannot be made based on only the magnitude of the electric current value or the electric power value. In this condition, however, the operation at the rated load can be carried out. In this region, the operating time ratio between the operation shown by the capacitor run curve A and the operation shown by the simple single-phase run curve B and the magnitude of the load are correlated with each other, and an overload judgment can be made by using the correlation therebetween. Thus, it becomes possible to make an overload judgment even in a use application range where it has heretofore been impossible to made an overload judgment with the conventional OLL.

Accordingly, in this embodiment, a threshold value is provided for the electric power value of the main coil ML in the single-phase induction motor section 120, and a threshold value is provided for the energizing time per unit time of the auxiliary coil AL. Either when the electric power value of the main coil ML exceeds the threshold value or when the energizing time per unit time of the auxiliary coil AL exceeds the threshold value, the single-phase induction motor is judged to be overloaded, and controlled so as to be stopped.

Figure 6A:
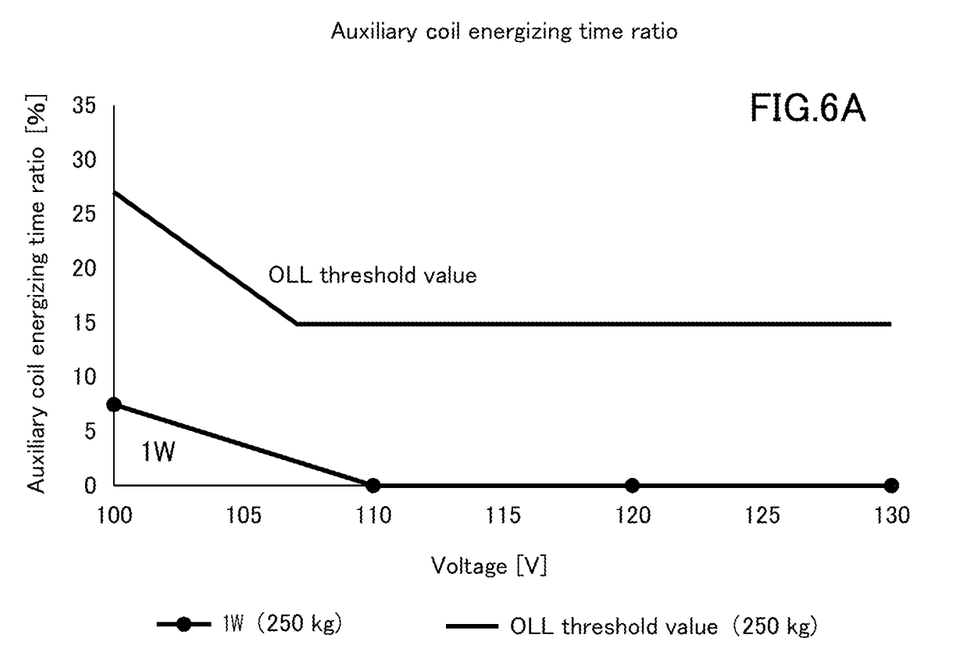
FIGS. 6A and 6B are diagrams for explaining the single-phase induction motor overload judgment according to the present invention.
Figure 6B:
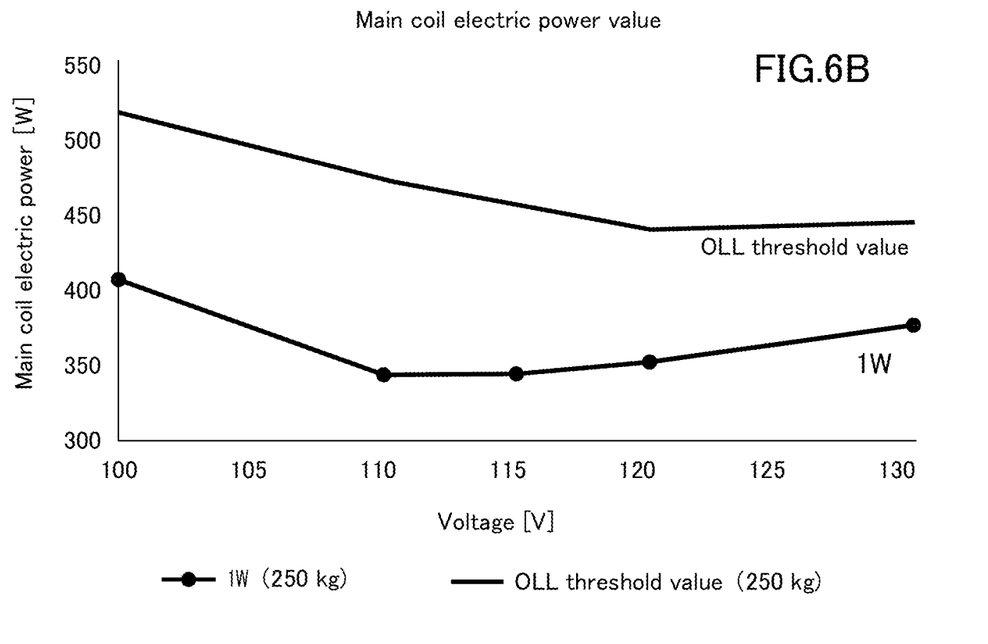

FIGS. 6A and 6B are diagrams explaining threshold values for judging whether or not the single-phase induction motor section 120 is overloaded. FIG. 6A is a diagram showing the auxiliary coil energizing time ratio, in which the axis of abscissas represents the voltage (V) supplied to the single-phase induction motor section 120, and in which the axis of ordinate represents the auxiliary coil AL energizing time ratio (%). The figure shows an example in which the present invention is adopted in an electric chain block compatible with a single-phase alternating-current power supply with a rated voltage of 115 V. In the figure, 1 W (250 kg) indicates that the rated load is 250 kg. The auxiliary coil AL energizing time ratio (%) shows the ratio of energizing time to energize the auxiliary coil AL to energizing time to energize the single-phase induction motor section 120. When the single-phase induction motor section 120 is energized, the main coil ML is energized at all time. Therefore, the auxiliary coil AL energizing time ratio is obtained as follows:

Auxiliary coil energizing time ratio (%)=(Energizing time to auxiliary coil AL)/(Energizing time to main coil ML)×100

FIG. 6A shows that when the voltage supplied to the single-phase induction motor section 120 is not less than 100 V, even if an object with a rated load of 250 kg is lifted, the single-phase induction motor can be operated without energizing the auxiliary coil AL. On the other hand, when the voltage supplied to the single-phase induction motor section 120 is 100 V, the auxiliary coil AL energizing time ratio (%) needs to be 7.5%. The figure shows that the OLL threshold value is 27% when the voltage supplied to the single-phase induction motor section 120 is 100 V, and that the OLL threshold value is 15% when the supplied voltage is not less than 107 V. Thus, an overload can be judged even in a load region where the capacitor run and the simple single-phase run are repeated by determining an OLL threshold value (overload judgment threshold value) based on the auxiliary coil energizing time ratio for each supply voltage.

FIG. 6B is a diagram showing the main coil electric power value, in which the axis of abscissas represents the voltage (V) supplied to the single-phase induction motor section 120, and in which the axis of ordinate represents the electric power (W) of the main coil ML. The figure shows an example in which the present invention is adopted in an electric chain block compatible with a single-phase alternating-current power supply with a rated voltage of 115 V The main coil electric power (W) shows electric power that the main coil ML consumes. The main coil electric power (W) is computed by a microcomputer (not shown) from the detected values of a current sensor and voltage sensor (not shown). FIG. 6B shows that when the voltage supplied to the single-phase induction motor section 120 is from 110 V to 120 V electric power of approximately 350 W is consumed, and that when the supplied voltage is 100 V and 130 V, electric power of 410 W and 380 W is consumed, respectively. Overload judgment (OLL) threshold values are determined as follows. With variation in the power consumption and so forth (not shown in the figure) taken into account, it is determined when the voltage is 100 V, 110 V, and 130 V, the OLL threshold value is 520 W, 470 W, and 440 W, respectively. With only the auxiliary coil energizing time ratio, it is difficult to perform accurate overload judgment in a range where the supply voltage exceeds 110 V. By determining an overload judgment threshold value based on the main coil electric power for each supply voltage, however, it is possible to perform overload judgment with high accuracy even in the above-described range.

Overload judgment may also be performed by determining an overload judgment threshold value based on the main coil electric current for each supply voltage instead of determining an overload judgment threshold value based on the main coil electric power for each supply voltage. In this case, the number of voltages to be measured should preferably be increased because the electric current value is larger than the electric power value in the magnitude of change in value for each voltage. Although in FIG. 6B threshold values are determined by measuring the load electric power every 5 V to 10 V, the load electric current may be measured every 2 V to 5 V to determine threshold values, for example.

In the electric chain block, the load applied to the single-phase induction motor section 120 pulsates because the load sheave meshed with the load chain has a polygonal configuration. In view of this, it is preferable to equalize the power consumption by taking into account the period of pulsation and to use the equalized power consumption for the OLL judgment.

Figure 7:
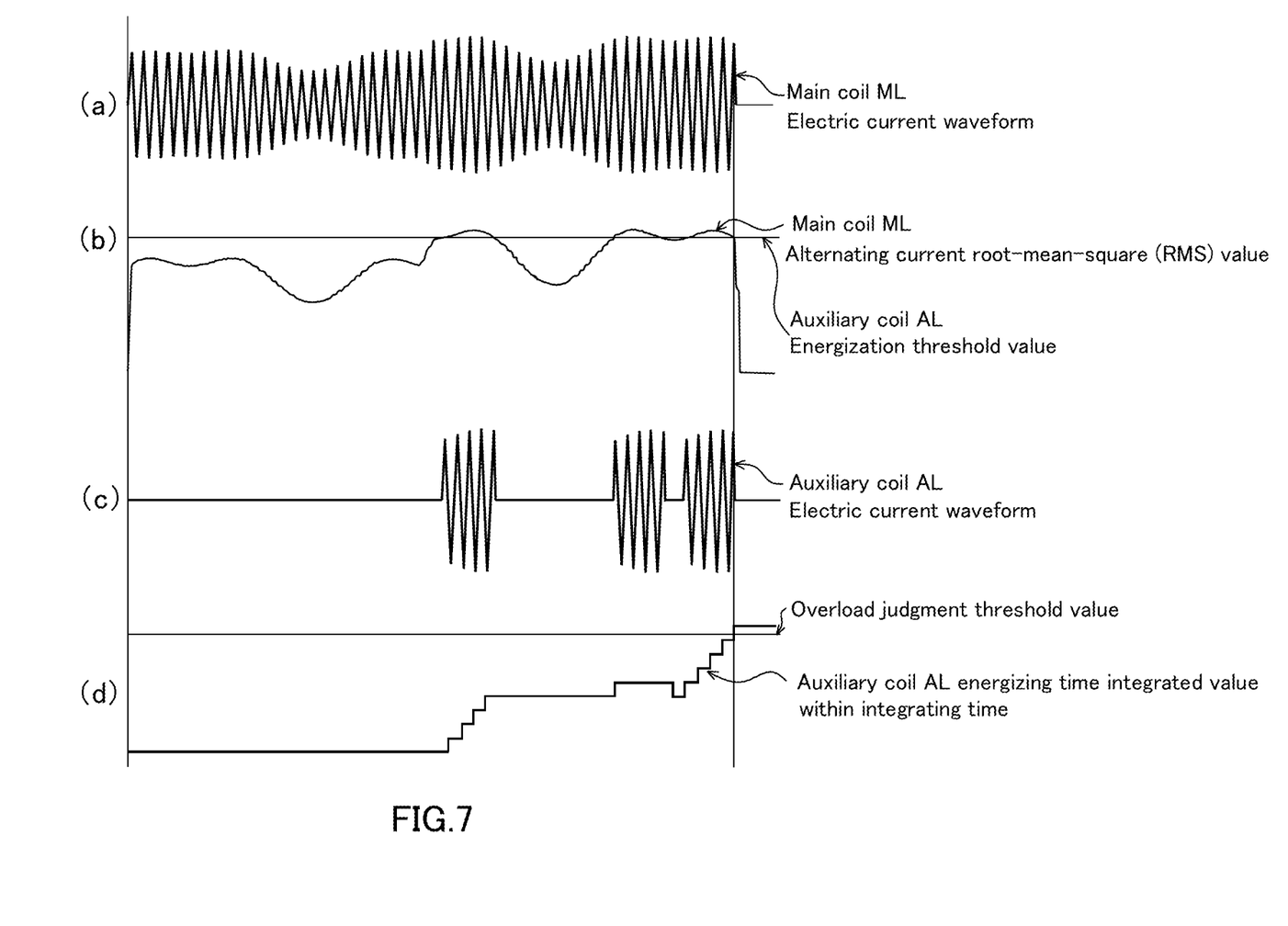
FIG. 7 is a diagram for explaining the single-phase induction motor overload judgment according to the present invention.

FIG. 7 is a schematic diagram for explaining the method of performing OLL judgment based on the ratio of energizing time of the auxiliary coil AL. FIG. 7(a) shows the waveform of electric current of the main coil ML detected with a current sensor. FIG. 7(b) shows the change of the alternating current root-mean-square value (RMS) of the main coil ML electric current. FIG. 7(c) shows the waveform of the electric current of the auxiliary coil AL detected with a current sensor. FIG. 7(d) is a chart for showing a method of integrating energizing time within a predetermined time and a method of judging an overload from an integrated value as a technique of judging an overload from the ratio of energizing time of the auxiliary coil AL, in which the axis of abscissas represents elapsed time, and the axis of ordinate represents energizing time within a predetermined time. The energizing time ratio (percentage) is a ratio (percentage) computed by dividing the length of time that the auxiliary coil AL is energized by the length of time that the main coil ML is energized. The ratio of energizing time should preferably be replaced by the energizing time within a predetermined time to perform detection. By so doing, the control can be facilitated. This method is shown in FIG. 7. In the single-phase induction motor, the main coil ML is energized continuously during operation. For the auxiliary coil AL, on the other hand, energization is on/off controlled, as shown in FIG. 7. Therefore, whether or not the auxiliary coil AL is energized is detected at a short detecting period, and the number of times that energization is detected is added up within a predetermined time, thereby making it possible to judge whether or not the ratio of energizing time has reached the overload judgment threshold value.

Figure 8:
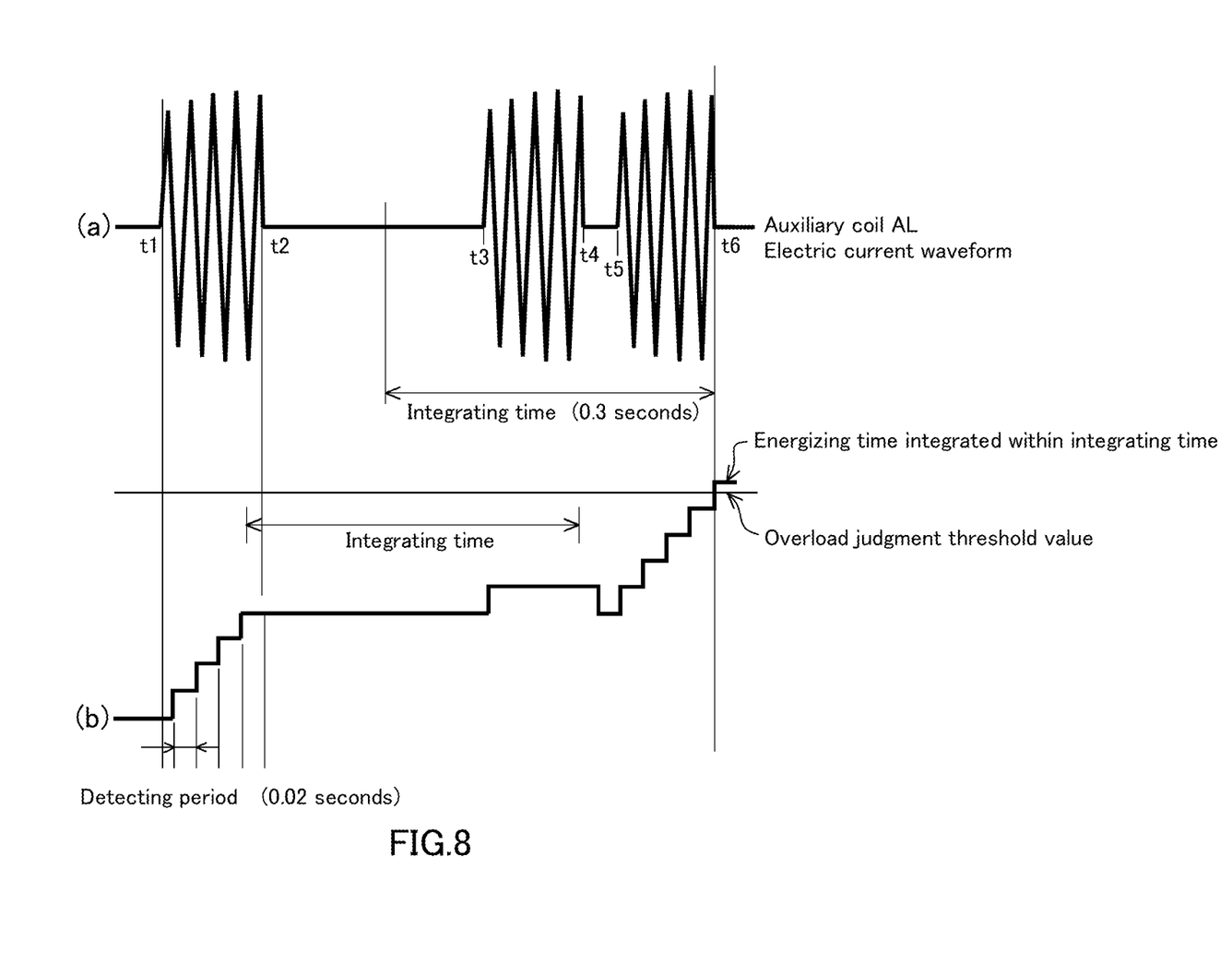
FIG. 8 is an enlarged view of an extracted part of FIG. 7.

FIG. 8 is an enlarged view of extracted portions (c) and (d) of FIG. 7, with an explanation of OLL judging method added thereto. FIGS. 8(a) and 8(b) correspond to FIGS. 7(c) and 7(d), respectively. In FIG. 8(a), $t_9$, $t_3$, and $t_5$ each represent time at which energization to the auxiliary coil AL is started, and $t_2$, $t_4$, and $t_6$ each represent time at which the energization is stopped.

It should be noted that although the arrangement shown in FIG. 7 is provided with only one on/off threshold value for the auxiliary coil AL in order to simplify the chart, it is preferable to provide a threshold value for switching from off to on and a threshold value for switching from on to off. Further, in view of the fact that the electric current value of the main coil ML fluctuates widely immediately after switching, it is preferable to invalidate switching based on the electric current value for a short period of time immediately after switching.

In the illustrated chart, the auxiliary coil AL energizing time ratio is converted into an auxiliary coil AL energizing time integrated value within a predetermined time to judge an overload (OLL). As shown in FIG. 8, the integrating time is set to 0.3 sec., and when the integrated value of energizing time within the integrating time reaches not less than 0.165 sec., which is not less than 55%, an overload (OLL) is judged. At time $t_1$, energization to the auxiliary coil AL is started, and at time $t_2$ when 0.09 sec. has elapsed, the energization to the auxiliary coil AL is terminated. Whether or not the auxiliary coil AL is energized is detected at an interval of a predetermined detecting period (for example, if the detecting period is determined to be one period of the alternating-current power supply frequency and if the frequency is 50 Hz, the detecting period is 0.02 sec.), and the energization integrated value increases in units of the predetermined detecting period (0.02 sec.). Next, from time $t_3$, the auxiliary coil AL is energized. In this regard, most of the time before time $t_2$ is outside the integrating time for integration at the point of time $t_4$; therefore, the integrated value increases by only 1 unit (0.02 sec.). From time $t_4$ to time $t_5$, the integrated value decreases by 1 unit from the point of time $t_4$. From time $t_5$ to time $t_6$, the energization to the auxiliary coil AL continues, and because time $t_3$ is within the integrating time for integration at time $t_6$, the integrated value also increases. At time $t_6$, the integrated value reaches the overload judgment threshold value (OLL judgment threshold value), an overload (OLL) is judged, and the energization to the main coil ML and the auxiliary coil AL is stopped.

Thus, an overload (OLL) can be judged by detecting whether or not the auxiliary coil AL is energized and integrating the energization to the auxiliary coil AL. Therefore, it is possible to use a small-sized and less costly current sensor for the auxiliary coil AL. Alternatively, it is also possible to judge an overload by using an internal signal in the control section which indicates that the electrical switching contact pair 121e is on instead of using a current sensor detecting electric current of the auxiliary coil AL. The detecting time and the integrating time are appropriately changed by using parameters.

The method of judging an overload by the energizing time ratio is as follows.

(Energizing time ratio)=(Auxiliary coil AL energizing time−Constant)÷(Main coil ML energizing time) is computed and compared to the OLL threshold value. The constant is a time determined in view of the time that the auxiliary coil AL is forcibly energized at starting, and it is preferable to make the constant settable as a parameter appropriately. The advantage of this is that the influence of foreign noise and so forth can be reduced.

There is another overload (OLL) judging method by which an overload (OLL) is judged by an energizing time ratio within a predetermined time. According to this method, after start-up time has elapsed, energization to the auxiliary coil is recorded, and an energizing time ratio is computed by the moving average method. Further, the energizing time ratio within a predetermined time is compared to an OLL threshold value, thereby making a judgment. This method advantageously improves the judgment accuracy in the case of a load that pulsates periodically.

Figure 9:
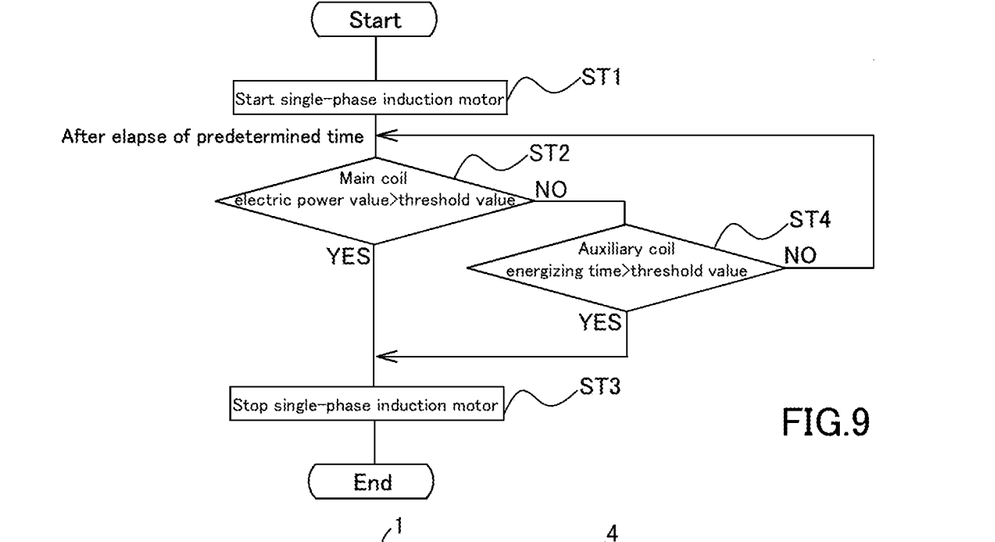
FIG. 9 is a chart showing the processing flow of the single-phase induction motor overload judgment according to the present invention.

FIG. 9 is a flow chart showing processing of overload judgment of a single-phase induction motor. First, at step ST1, the single-phase induction motor is started in the capacitor run mode shown in FIG. 3. After the elapse of a predetermined time, at step ST2, it is judged whether or not the electric power value of the main coil ML is in excess of the threshold value. If YES is the result at step ST2, the process proceeds to step ST3 to stop the single-phase induction motor. If at the above-described step ST2 the electric power value of the main coil ML is not in excess of the threshold value, the process proceeds to step ST4 to judge whether or not the integrated value of energizing time of the auxiliary coil AL within a predetermined time is in excess of the overload judgment threshold value. If NO is the result at step ST4, the process proceeds to step ST2, and the above-described processing is repeated. If, on the other hand, the integrated value of energizing time of the auxiliary coil AL is in excess of the overload judgment threshold value (YES), the process proceeds to step ST3 to stop the single-phase induction motor. The processing is carried out by a microcomputer disposed on the SSR power circuit 121 side.

Figure 10:
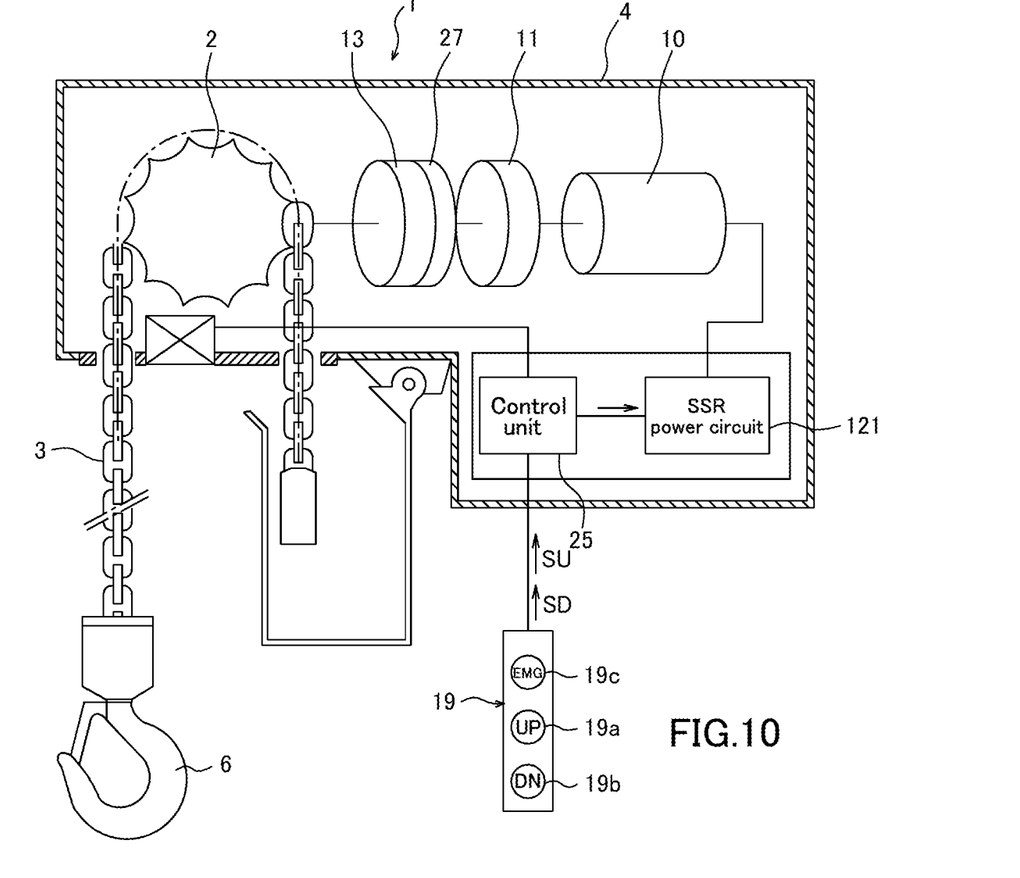
FIG. 10 is a schematic system configuration diagram of an electric chain block using the present invention.

FIG. 10 is a schematic configuration diagram of an electric chain block 1 using the single-phase induction motor controlling method and apparatus according to the present invention. The electric chain block 1 includes components and devices such as a single-phase induction motor 10 for hoisting and lowering a load, a friction clutch (clutch with overload preventing device) 11, an electromagnetic brake 27, a speed reduction gear mechanism 13, an SSR (solid-state relay) power circuit 121, and a control unit 25. These components and devices are adjusted so as to perform their respective functions and appropriately disposed in a machine casing 4. Reference numeral 2 denotes a load sheave (rotating device) disposed in the machine casing 4. The load sheave 2 has a load chain 3 wound thereon to hoist and lower a load (not shown).

In order to hoist and lower (lift up and lower down) a load, the electric chain block 1 needs to be capable of rotating the load sheave 2 in a hoisting direction (forward rotation) and in a lowering direction (reverse rotation). The load sheave 2 may be made to rotate forward and reverse by a method, for example, by modifying the arrangement of the reduction gear mechanism 13. In this regard, the SSR power circuit 121 is provided with the forward-reverse rotating function.

Figure 11:
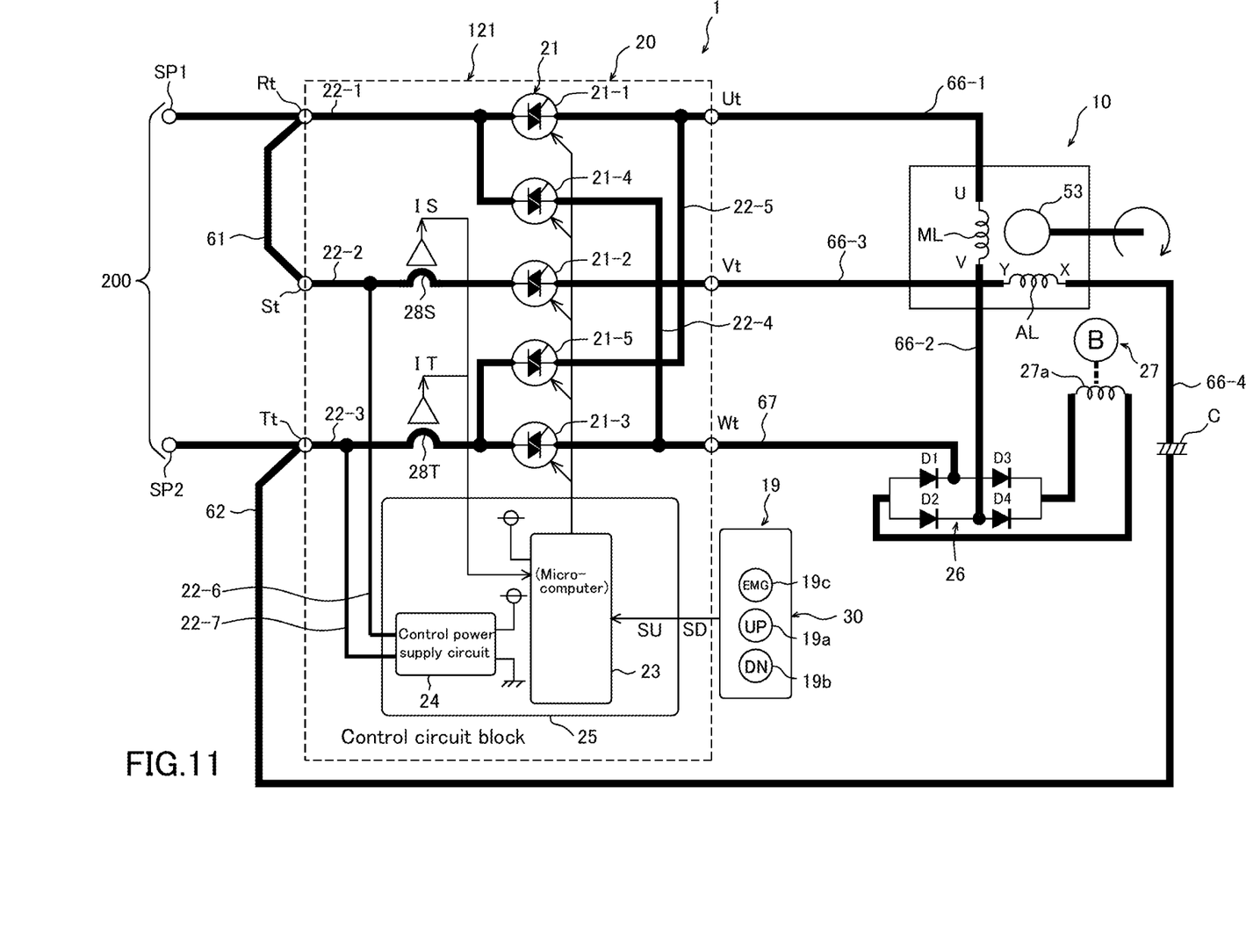
FIG. 11 is a diagram showing the electrical connection configuration of the electric chain block according to the present invention.

FIG. 11 is a diagram showing the electrical connection configuration of the control unit 25, the SSR power circuit 121, the electromagnetic brake 27, etc. of the electric chain block 1. Here, the SSR power circuit 121 is provided with the function of rotating the single-phase induction motor 10 forward and reverse, and has non-contact switching devices 21-1 to 21-5 used as on-off devices. The SSR power circuit 121 includes a control board 20. The control board 20 is provided with two external wires 61 and 62 on an input side thereof where supply terminals Rt, St and Tt are disposed. The external wire 61 is connected to the supply terminal Rt and the supply terminal St to electrically unite (short-circuit) the two terminals, and one end of the external wire 61 is defined as a power supply terminal SP1 which is connected a single-phase alternating-current power supply 200. The external wire 62 is connected to the supply terminal Tt and a starting capacitor C to electrically unite (short-circuit) these elements, and one end of the external wire 62 is defined as a power supply terminal SP2 which is connected the single-phase alternating-current power supply 200.

A single-phase induction motor 10 is disposed on the output side of the control board 20 where output terminals Ut, Vt and Wt of the control board 20 are disposed. The single-phase induction motor 10 is configured to include a main coil ML and an auxiliary coil AL. One end U of the main coil ML is connected to the output terminal Ut of the control board 20 through a lead wire 66-1, and the other end V of the main coil ML is electrically connected through a lead wire 66-2 to the cathode of a rectification device D2 and the anode of a rectification device D4 in a full-wave rectification circuit 26. The cathodes of rectification devices D3 and D4 of the full-wave rectification circuit 26 are electrically connected to one end of an exciting coil 27a of the electromagnetic brake 27. The other end of the exciting coil 27a is electrically connected to the anodes of rectification devices D1 and D2 of the full-wave rectification circuit 26. Further, the cathode of the rectification device D1 and the anode of the rectification device D3 in the full-wave rectification circuit 26 are connected to the output terminal Wt of the control board 20 through a lead wire 67. One end Y of the auxiliary coil AL is connected to the output terminal Vt of the control board 20 through a lead wire 66-3, and the other end X of the auxiliary coil AL is connected to one end of the starting capacitor C. The non-contact switching device 21-1 on/off controls the electrical connection between the supply terminal Rt and the output terminal Ut. The non-contact switching device 21-2 on/off controls the electrical connection between the supply terminal St and the output terminal Vt. The non-contact switching device 21-3 on/off controls the electrical connection between the supply terminal Tt and the output terminal Wt. The non-contact switching device 21-4 on/off controls the electrical connection between the supply terminal Rt and the output terminal Wt. The non-contact switching device 21-5 on/off controls the electrical connection between the supply terminal Tt and the output terminal Ut.

The control board 20 has mounted thereon a main current sensor 28T detecting a main electric current flowing through the main coil ML of the single-phase induction motor 10, an auxiliary current sensor 28S detecting an auxiliary electric current flowing through the auxiliary coil AL, and so forth. A control circuit block 25 including a control power supply circuit 24 has a microcomputer 23 mounted thereon and is configured such that the microcomputer 23 is supplied as inputs with operation signals SU and SD from an operation unit 19, a main current detection signal IT detected by the main current sensor 28T, and an auxiliary current detection signal IS detected by the auxiliary current sensor 28S. In addition, the control power supply circuit 24 is configured such that a single-phase alternating current is input thereto from the single-phase alternating-current power supply 200 through wires 22-6 and 22-7. In addition, there is provided a voltage sensor (not shown) detecting a power supply voltage or a voltage to be output to the main coil ML, and a voltage detection signal VT detected by the voltage sensor is input to the microcomputer 23.

When a hoisting pushbutton switch 19a of the operation unit 19 is pressed, a hoisting signal SU is output to the microcomputer 23, and the non-contact switching devices 21-1 and 21-3 are on-controlled by processing with the microcomputer 23 (at this time, the non-contact switching devices 21-4 and 21-5 remain off), and at the same time, the contact switching device 21-2 is also on-controlled for a predetermined period of time at starting. Thereafter, energization to the auxiliary coil AL is controlled by on-off controlling the non-contact switching device 21-2 on the basis of the main current detection signal IT to continue the hoisting operation. Immediately after switching the energization of the auxiliary coil AL, the electric current flowing through the main coil ML is unstable; therefore, there is provided a time during which the on/off switching of the auxiliary coil AL based on the main current detection signal IT is invalidated. When the hoisting pushbutton switch 19a is released to stop the hoisting signal SU, the non-contact switching devices 21-1, 21-2 and 21-3 are off-controlled to shut off the supply of electric power to the electromagnetic brake 27, so that the brake 27, which has been released during the hoisting operation, is activated. When the lowering pushbutton switch 19b is pressed, a lowering signal SD is output, and the non-contact switching devices 21-4 and 21-5 are on-controlled by processing with the microcomputer 23 (at this time, the non-contact switching devices 21-1 and 21-3 remain off), and at the same time, the contact switching device 21-2 is also on-controlled for a predetermined period of time at starting. Thereafter, energization of the auxiliary coil AL is controlled by on-off controlling the non-contact switching device 21-2 to continue the lowering operation on the basis of the main current detection signal IT. Immediately after switching the energization of the auxiliary coil AL, the electric current flowing through the main coil ML is unstable; therefore, there is provided a time during which the on/off switching of the auxiliary coil AL based on the main current detection signal IT is invalidated. When the lowering pushbutton switch 19b is released to stop the lowering signal SD, the non-contact switching devices 21-2, 21-4 and 21-5 are controlled to turn off, so that the supply of electric power to the electromagnetic brake 27 is also shut off. Therefore, the electromagnetic brake 27, which has been released during the lowering operation, is activated.

During the hoisting operation, the voltage signal VT and the current detection signals IT and IS are monitored to perform hoisting control on the basis of the flow of overload judgment processing shown in FIG. 9, thereby preventing lifting up an overload.

When a hoisting signal SU is detected by the control circuit block 25, the main coil ML and auxiliary coil AL of the single-phase induction motor 10 are simultaneously supplied with single-phase electric power to start forward rotation of the single-phase induction motor 10. One second after starting, comparison is made as to whether or not the main coil electric power is in excess of the electric power overload threshold value. When the main coil electric power is in excess of the electric power overload threshold value, the supply of electric power to the single-phase induction motor 10 is stopped. When the main coil electric power is not in excess of the electric power overload threshold value, comparison is made as to whether or not the auxiliary coil energizing time is in excess of the overload threshold value. When the auxiliary coil energizing time is in excess of the overload threshold value, the supply of electric power to the single-phase induction motor 10 is stopped. When the auxiliary coil energizing time is not in excess of the overload threshold value, comparison is made as to whether or not the main coil electric power is in excess of the electric power overload threshold value. Thereafter, the above-described control is repeated while the hoisting signal SU is being detected, and when the hoisting signal SU is no longer detected, the supply of electric power to the single-phase induction motor 10 is stopped. As shown in FIGS. 6A and 6B, the electric power overload threshold value and the energizing time ratio overload threshold value are predetermined for each voltage applied to the main coil ML.

Although some embodiments of the present invention have been explained above, the present invention is not limited to the above-described embodiments but can be modified in a variety of ways without departing from the scope of the claims and the technical idea indicated in the specification and the drawings.

LIST OF REFERENCE SIGNS

1: electric chain block
2: load sheave
3: load chain
4: machine casing
6: hook

10: single-phase induction motor
11: friction clutch
13: speed reduction gear mechanism
19: operation unit
20: control board
21-1, 21-2, 21-3, 21-4, 21-5: non-contact switching device
27: electromagnetic brake
120: single-phase induction motor section
ML: main coil
AL: auxiliary coil
121: SSR (solid-state relay) power circuit
121a, 121b, 121c: current path
121d, 121e, 121f: switching contact pair
200: single-phase alternating-current power supply (commercial power supply)
C: capacitor

The invention claimed is:

1. A single-phase induction motor control method of controlling a single-phase induction motor including a main coil, an auxiliary coil, a capacitor, and a driving circuit, the method comprising:
supplying an electric current to the main coil from a single-phase alternating-current power supply through the driving circuit;
supplying an electric current to the auxiliary coil from the single-phase alternating-current power supply through the driving circuit and via the capacitor; and
judging that the single-phase induction motor is overloaded in response to electric power supplied to the main coil exceeding a predetermined overload judgment threshold value;
wherein an overload judgment threshold value is provided for a ratio of energizing time of the auxiliary coil to an operating time of the single-phase induction motor, and the single-phase induction motor is judged to be overloaded in response to the ratio of energizing time of the auxiliary coil to the operating time of the single-phase induction motor exceeding the overload judgment threshold value provided for the ratio of the energizing time of the auxiliary coil to the operating time of the single-phase induction motor.

2. A single-phase induction motor control apparatus for controlling a single-phase induction motor including a main coil, an auxiliary coil, a capacitor, and a driving circuit, wherein the main coil is supplied with an electric current from a single-phase alternating-current power supply through the driving circuit, and the auxiliary coil is supplied with an electric current from the single-phase alternating-current power supply through the driving circuit and via the capacitor, the single-phase induction motor control apparatus is configured to judge that the single-phase induction motor is overloaded in response to electric power supplied to the main coil exceeding a predetermined overload judgment threshold value;
wherein an overload judgment threshold value is provided for a ratio of energizing time of the auxiliary coil to an operating time of the single-phase induction motor, and the single-phase induction motor is judged to be overloaded in response to the ratio of energizing time of the auxiliary coil to the operating time of the single-phase induction motor exceeding the overload judgment threshold value provided for the ratio of the energizing time of the auxiliary coil to the operating time of the single-phase induction motor.

3. An electric chain block including a load sheave having a load chain engaged therewith, and a single-phase induction motor rotating the load sheave, the electric chain block being characterized by including the single-phase induction motor control apparatus of claim 2.

4. A single-phase induction motor control method of controlling a single-phase induction motor including a main coil, an auxiliary coil, a capacitor, and a driving circuit, the method comprising:
supplying an electric current to the main coil from a single-phase alternating-current power supply through the driving circuit;
supplying an electric current to the auxiliary coil from the single-phase alternating-current power supply through the driving circuit and via the capacitor; and
judging that the single-phase induction motor is overloaded in response to electric power supplied to the main coil exceeding a predetermined overload judgment threshold value;
wherein an overload judgment threshold value is provided for a ratio of energizing time of the auxiliary coil within a predetermined time to an operating time of the single-phase induction motor within the predetermined time, and the single-phase induction motor is judged to be overloaded in response to the ratio of energizing time of the auxiliary coil within the predetermined time to the operating time of the single-phase induction motor within the predetermined time exceeding the overload judgment threshold value provided for the ratio of the energizing time of the auxiliary coil within the predetermined time to an operating time of the single-phase induction motor within the predetermined time.

5. A single-phase induction motor control method of controlling a single-phase induction motor including a main coil, an auxiliary coil, a capacitor, and a driving circuit, the method comprising:
supplying an electric current to the main coil from a single-phase alternating-current power supply through the driving circuit;
supplying an electric current to the auxiliary coil from the single-phase alternating-current power supply through the driving circuit and via the capacitor; and
judging that the single-phase induction motor is overloaded in response to electric power supplied to the main coil exceeding a predetermined overload judgment threshold value;
wherein an overload judgment threshold value is provided for an integrated value of energizing time of the auxiliary coil within a predetermined time, and the single-phase induction motor is judged to be overloaded in response to the integrated value of energizing time of the auxiliary coil within the predetermined time exceeding the overload judgment threshold value provided for the integrated value of the energizing time of the auxiliary coil within the predetermined time.

6. A single-phase induction motor control apparatus for controlling a single-phase induction motor including a main coil, an auxiliary coil, a capacitor, and a driving circuit, wherein the main coil is supplied with an electric current from a single-phase alternating-current power supply through the driving circuit, and the auxiliary coil is supplied with an electric current from the single-phase alternating-current power supply through the driving circuit and via the capacitor, the single-phase induction motor control apparatus is configured to judge that the single-phase induction motor is overloaded in response to electric power supplied to the main coil exceeding a predetermined overload judgment threshold value;

wherein an overload judgment threshold value is provided for a ratio of energizing time of the auxiliary coil within a predetermined time to an operating time of the single-phase induction motor within the predetermined time, and the single-phase induction motor is judged to be overloaded in response to the ratio of energizing time of the auxiliary coil within the predetermined time to the operating time of the single-phase induction motor within the predetermined time exceeding the overload judgment threshold value provided for the ratio of energizing time of the auxiliary coil within the predetermined time to the operating time of the single-phase induction motor within the predetermined time.

7. A single-phase induction motor control apparatus for controlling a single-phase induction motor including a main coil, an auxiliary coil, a capacitor, and a driving circuit, wherein the main coil is supplied with an electric current from a single-phase alternating-current power supply through the driving circuit, and the auxiliary coil is supplied with an electric current from the single-phase alternating-current power supply through the driving circuit and via the capacitor, the single-phase induction motor control apparatus is configured to judge that the single-phase induction motor is overloaded in response to electric power supplied to the main coil exceeding a predetermined overload judgment threshold value;

wherein an overload judgment threshold value is provided for an integrated value of energizing time of the auxiliary coil within a predetermined time, and the single-phase induction motor is judged to be overloaded in response to the integrated value of energizing time of the auxiliary coil within the predetermined time exceeding the overload judgment threshold value provided for the integrated value of the energizing time of the auxiliary coil within the predetermined time.

8. An electric chain block including a load sheave having a load chain engaged therewith, and a single-phase induction motor rotating the load sheave, the electric chain block being characterized by including the single-phase induction motor control apparatus of claim 6.

9. An electric chain block including a load sheave having a load chain engaged therewith, and a single-phase induction motor rotating the load sheave, the electric chain block being characterized by including the single-phase induction motor control apparatus of claim 7.

* * * * *